United States Patent [19]

Taki

[11] Patent Number: 4,509,870
[45] Date of Patent: Apr. 9, 1985

[54] PLASTIC SLIDE BEARING

[75] Inventor: Kiyozi Taki, Gamagouri, Japan

[73] Assignee: Kabushiki Kaisha Miura Kumihimo Kogyo, Gamagouri, Japan

[21] Appl. No.: 529,961

[22] Filed: Sep. 7, 1983

[30] Foreign Application Priority Data

May 16, 1983 [JP] Japan .................................. 58-85654

[51] Int. Cl.³ ............................................. F16C 33/20
[52] U.S. Cl. ..................................... 384/296; 384/298
[58] Field of Search ............... 384/296, 300, 298, 295, 384/297; 308/3 R

[56] References Cited

U.S. PATENT DOCUMENTS

| 3,055,788 | 9/1962 | Stanhope et al. | 384/298 |
| 3,104,136 | 9/1963 | Merriman | 384/296 |
| 3,110,530 | 11/1963 | Herman | 384/298 |
| 3,458,374 | 7/1969 | Shobert | 384/300 |
| 3,507,023 | 4/1970 | Matt et al. | 384/300 |
| 4,432,659 | 2/1984 | Tuckey | 384/300 |

FOREIGN PATENT DOCUMENTS

| 33348 | 3/1975 | Japan . |
| 62243 | 5/1976 | Japan . |
| 106747 | 8/1979 | Japan . |
| 160626 | 9/1983 | Japan . |

Primary Examiner—Lenard A. Footland
Attorney, Agent, or Firm—Bucknam and Archer

[57] ABSTRACT

A plastic sliding bearing comprises an inner cylindrical member of fluoride such as fluoroplastics and an outer cylindrical member of fiber reinforced thermosetting resin arranged coaxially and integrally with the inner cylindrical member. The inner and outer cylindrical members are firmly and rigidly united with each other to prevent separation from each other during use of the sliding bearing. The firm and reliable unification of the inner and outer cylindrical members is achieved by providing on the external surface of the inner cylindrical member projections or biting means firmly engageable with the internal surface of the outer cylindrical member. The plastic sliding bearing of the present invention exhibits superior durability to similar plastic slide bearings of the prior art.

3 Claims, 4 Drawing Figures

PLASTIC SLIDE BEARING

This invention relates to a plastic slide bearing, especially to a plastic slide bearing comprising an inner cylindrical member of fluoride such as fluoroplastics and an outer cylindrical member of fiber reinforced thermosetting resin arranged coaxially and integrally with the inner cylindrical member.

A plastic slide bearing having a slide contacting portion formed of fluoride such as fluoroplastics has been widely used in many applications in place of a metal slide bearing, since the fluoride has superior sliding properties and therefore can be used without lubricant. Furthermore, it is possible to greatly reduce the weight of the slide bearing by forming the whole of the bearing of plastics and also to reduce the noise and heat caused during the use thereof.

However, the most troublesome disadvantage of the plastic slide bearing is that the inner and outer cylindrical members forming the slide bearing are liable to be easily separated from each other and fractured during the use thereof. The reason why it is impossible to firmly and rigidly unite the inner and outer cylindrical members is that the fluoride forming the inner cylindrical member has self-lubricating properties which are incompatible with the thermosetting resin forming the outer cylindrical member.

Accordingly, it is an object of the present invention to provide a plastic slide bearing having superior durability.

This object is achieved by providing on the external surface of the inner cylindrical member projections or biting means firmly engageable with the internal surface of the outer cylindrical member.

This invention will now be described by way of examples, with reference to the accompanying drawings, in which.

Figure 1:
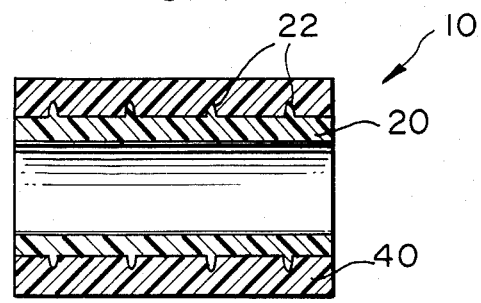
FIG. 1 is a longitudinal cross-sectional view of the plastic slide bearing of the present invention.

The fundamental structure of a plastic slide bearing 10 of the present invention is shown in FIG. 1. The plastic slide bearing 10 is formed of an inner cylindrical member 20 of fluoride such as fluoroplastics in which a rotating shaft (not shown) is supported and an outer cylindrical member 40 of fiber reinforced thermosetting resin arranged coaxially and integrally with the inner cylindrical member 20. Projections or biting means 22 are formed on the external surface of the inner cylindrical member 20. The projections or biting means 22 firmly bite the inner surface of the outer cylindrical member 40 and prevent the separation of the inner and outer cylindrical members from each other during use of the plastic slide bearing 10. In order to give high mechanical strength to the slide bearing 10, it is preferable to make the outer cylindrical member 40 of a compound material of glass fibers, carbon fibers or aromatic polyamide fibers impregnated with thermosetting resin such as epoxy resin, melamine resin or urea resin.

Figure 2A:
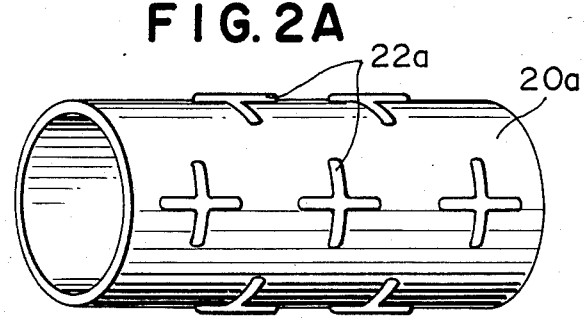
FIGS. 2A and 2B are a perspective view showing a first embodiment of the inner cylindrical member of the plastic slide bearing of the present invention.
Figure 2B:
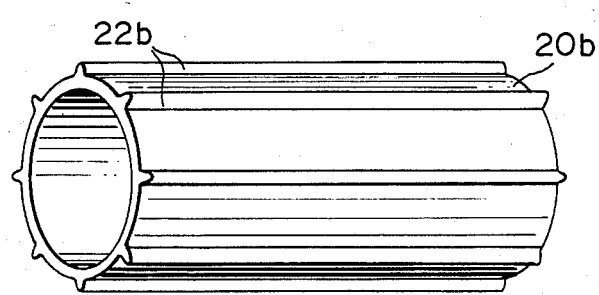

In the first embodiment of the present slide bearing, the inner cylindrical member is formed as a fluoroplastic pipe such as those denoted by numerals 20a and 20b in FIGS. 2A and 2B. The inner cylindrical member 20a in FIG. 2A is provided with cross configured projections on the external surface thereof and the inner cylindrical member 20b in FIG. 2B is provided with straight projections on the external surface thereof. In order to increase the gripping force or biting force between the inner and outer cylindrical members, it is also possible to adopt various other suitable configurations for the projections.

Each of the inner cylindrical members 20a and 20b is integrally formed with the outer cylindrical member 40 of thermosetting resin by the F.W. (Filament Winding) method.

Figure 3:
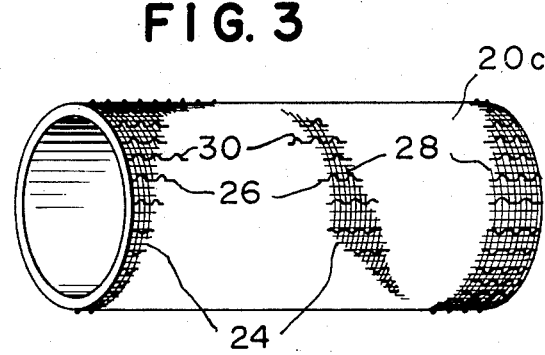
FIG. 3 is a perspective view showing a second embodiment of the inner cylindrical member of the plastic slide bearing of the present invention.

In the second embodiment of the present slide bearing, the inner cylindrical member is formed as a cylindrical cloth 20C (FIG. 3) which is woven of fluoride fibers and non-fluoride fibers (e.g. polyester fibers). In a preferred embodiment of the cylindrical cloth 20C, the fluoride fibers are used for warp 24 and polyester fibers are used for loop threads 26 and weft 28. Loops 30 formed by the loop threads 26 provide firm gripping force or biting force between the inner and outer cylindrical members and therefore have the same function as that of the projections 22a and 22b in the first embodiment. Thus, it is required that the loops 30 of the loop threads 26 not be shrunk by heat during the unification of the cylindrical cloth 20C with the outer cylindrical member 40 and that the loop threads 26 have superior compatibility with the thermosetting resin of the outer cylindrical member 40. If these requirements are satisfied, suitable fibers other than polyester fibers may also be adopted as the loop threads 26.

Most preferably the loop threads 26 should be mono-filament threads having high heat resisting properties. The loops 30 may be formed in weft 28 instead of in the loop thread 26 or the warp 24. The inner cylindrical member or cylindrical cloth 20C is united with the outer cylindrical member 40 of thermosetting resin by the F.W. method. The plastic slide bearing of the second embodiment in which the inner cylindrical member is the cylindrical cloth 20C has advantages in that both friction and heat generation are reduced as compared with the plastic slide bearing using the fluoroplastic pipes 20a and 20b of the first embodiment, since the contact between the rotating shaft and the inner cylindrical member is distributed over many points of contact in the case of the cylindrical cloth 20C. As a result, the cylindrical cloth 20C has much smaller area of contact with the rotating shaft than in the case of the full surface contact of the pipes 20a and 20b.

As stated above, since the inner and outer cylindrical members are firmly united by the projections or biting means provided on the external surface of the inner cylindrical member, the plastic slide bearing of the present invention exhibits superior durability.

What is claimed is:

1. A plastic slide bearing comprising an inner cylindrical member and an outer cylindrical member of fiber reinforced thermosetting resin coaxially and integrally formed with the inner cylindrical member, characterized in that said inner cylindrical member is a cylindrical cloth woven by warps of fluoride fibers and loop threads and wefts of non-fluoride fibers, and loops formed in the loop threads of said non-fluoride fibers are provided only on the external surface of the cylindrical cloth to firmly grip the outer cylindrical member of fiber reinforced thermosetting resin.

2. A plastic slide bearing of claim 1 in which said non-fluoride fibers are polyester fibers.

3. A plastic slide bearing of claim 1 in which said loop forming fibers are mono-filament fibers of polyester.

* * * * *